(12) United States Patent
Ford (10) Patent No.: US 9,079,126 B2
(45) Date of Patent: *Jul. 14, 2015

(54) CENTRIFUGAL SEPARATOR

(71) Applicant: Claude Laval Corporation, Fresno, CA (US)

(72) Inventor: Steven David Ford, Fresno, CA (US)

(73) Assignee: Claude Laval Corporation, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,069

(22) Filed: Feb. 8, 2014

(65) Prior Publication Data

US 2014/0151290 A1 Jun. 5, 2014

Related U.S. Application Data

(63) Continuation of application No. 13/168,995, filed on Jun. 26, 2011, now Pat. No. 8,678,204.

(51) Int. Cl.

| | | |
|---|---|---|
| *B01D 21/00* | (2006.01) | |
| *B01D 21/24* | (2006.01) | |
| *B01D 21/26* | (2006.01) | |
| *B04C 5/04* | (2006.01) | |
| *B04C 5/06* | (2006.01) | |
| *B04C 5/081* | (2006.01) | |
| *B04C 5/103* | (2006.01) | |
| *B04C 5/12* | (2006.01) | |
| *B04C 5/181* | (2006.01) | |
| *B04C 5/185* | (2006.01) | |

(52) U.S. Cl.
CPC ............ *B01D 21/26* (2013.01); *B01D 21/0033* (2013.01); *B01D 21/2411* (2013.01); *B01D 21/267* (2013.01); *B04C 5/04* (2013.01); *B04C 5/06* (2013.01); *B04C 5/081* (2013.01); *B04C 5/103* (2013.01); *B04C 5/12* (2013.01); *B04C 5/181* (2013.01); *B04C 5/185* (2013.01)

(58) Field of Classification Search
CPC ............... B01D 21/26; B01D 21/0033; B01D 21/2411; B01D 21/267; B04C 5/181; B04C 5/081; B04C 5/12; B04C 5/06; B04C 5/185; B04C 5/04; B04C 5/103
See application file for complete search history.

(56) References Cited

U.S. PATENT DOCUMENTS

| | | | |
|---|---|---|---|
| 3,512,651 | A | 5/1970 | Laval, Jr. |
| 4,072,481 | A | 2/1978 | Laval, Jr. |
| 4,784,634 | A | 11/1988 | Schiele |
| 5,618,409 | A | 4/1997 | Kreill |

(Continued)

*Primary Examiner* — David A Reifsnyder
(74) *Attorney, Agent, or Firm* — James M. Duncan, Esq.; Klein DeNatale Goldner (57) ABSTRACT

A centrifugal separator of the present invention comprises an upper inlet chamber and separation barrel connected thereto. The upper inlet chamber comprises an inlet through which a solids-laden fluid is introduced. An upper portion of the separation barrel extends into the upper inlet chamber below the inlet, such that the interior wall of the upper inlet chamber and the upper portion of the separation volume define a space, called the vestibular chamber. The vestibular chamber is defined at its upper end by a horizontally disposed plate larger in diameter than the separation barrel, but smaller in diameter than the internal diameter of the upper inlet chamber. The upper portion of the separation barrel comprises a plurality of generally axially-oriented slots which may penetrate through the wall of the separation barrel tangentially, so as to generally induce a tangential flow pattern to fluid entering the separation barrel from the vestibular chamber.

22 Claims, 7 Drawing Sheets

(56) References Cited

U.S. PATENT DOCUMENTS

| | | |
|---|---|---|
| 5,637,217 A | 6/1997 | Herman |
| 6,143,175 A | 11/2000 | Ford et al. |
| 6,666,338 B1 | 12/2003 | Henriksson et al. |
| 7,025,890 B2 | 4/2006 | Moya |
| 7,335,313 B2 | 2/2008 | Moya |
| 8,590,713 B2 | 11/2013 | Ford |
| 8,678,204 B2 * | 3/2014 | Ford .......................... 210/512.1 |
| 2008/0171645 A1 | 7/2008 | Borgstromm et al. |

* cited by examiner

CENTRIFUGAL SEPARATOR

CROSS-REFERENCE TO RELATED APPLICATIONS

This is a continuation application of U.S. patent application Ser. No. 13/168,995 which was filed on Jun. 26, 2011, and now issued as U.S. Pat. No. 8,678,204, for which application this inventor claims domestic priority.

BACKGROUND OF THE INVENTION

The disclosed device generally relates to devices used to separate solids from liquids, and specifically to an improved centrifugal separator which includes internal structure which enable the attainment of preferred flow regimes through the separator, resulting in superior separation of solids from the liquid and greater efficiency in operation of the separator.

Centrifugal separators are generally known as a means to separate solids from flowing streams of fluid in which the solids are entrained. The typical configuration of a centrifugal separator is to inject a stream of the influent through a nozzle tangentially into a cylindrical separation barrel. As the injected stream whirls around the inside wall of the separation barrel, the high g forces within the stream cause the solid particles to migrate toward the wall as the whirling stream flows from one end of the separation barrel to the other, typically from an upper elevation to a lower elevation within the separation barrel. The force required to move the particles to the side wall is defined by the equation $F=mv^2/r$, where m equals the mass of the particle, v is the tangential velocity of the particle, and r is the radius of the separator.

At or near a lower end of the separation barrel there is a spin plate which induces a spiral motion to the stream, thus creating a vortex, the liquid of which flows away from the spin plate toward a centrally located structure typically referred to as the vortex finder, and into the exit port. The filtrate exiting the separator is, ideally, substantially free from entrained solids. There is an opening or slot near the spin plate at the lower end of the barrel through which a substantial portion of the entrained solids which are nearer the wall of the separator barrel will pass. These solids accumulate at the bottom of the barrel within a collection chamber. This general type of centrifugal separator is shown in U.S. Pat. Nos. 4,072,481, 5,811,006 and 6,143,175, which are incorporated herein by reference in their entireties for their showing of the theory and practice of such separators.

The function and efficiency of this type of separator are in large part derived from the velocity and smoothness of flow of the stream within the separator. The desired flow regime within the separator is laminar flow, which is characterized by smooth, constant fluid motion. On the other hand, turbulent flow produces random eddies and flow instabilities. Turbulence anywhere in the system results in the need for more power to provide a higher injection pressure, or a reduction in separation efficiency. As turbulence increases, particle entrainment increases in the stream reflected from the spin plate and exiting the separator through the vortex finder.

The increase in power demand can be significant, particularly where high flow rates are required, such as in cooling tower applications where the required flow rate may be 13,000 gpm or higher. Turbulence in the separator can significantly impact the energy demands of the pumps required to drive the stream through the separator.

Turbulence also aggravates abrasion of the internal components of the separator. The solids entrained in the influent are abrasive. In order to generate the substantial g forces required for centrifugal separation of the solids from the liquid, the velocity of the particles and the force of their contact with parts of the separator will result in a substantial wear rate that can only partially be compensated for by the use of abrasion resistant materials such as steel alloys. Thus, non-turbulent and smooth flow results in reduced wear throughout the entire system. However, notwithstanding improvements which have been made in the art in reducing turbulence throughout various zones within the separator, the inventor herein has discovered that there remain portions of the known cylindrical centrifugal separators which continue to present a challenge in achieving non-turbulent flow. It is desirable that the collection chamber be maintained in a quiescent condition to facilitate the settling of the solids in the collection chamber, and reduce the re-entrainment of solids into the liquid which is returned from the collection chamber to the separation chamber.

It follows that reduction of turbulence throughout the system can importantly improve separation, reduce power cost, extend the time between repairs, and extend the useful life of the device. The present invention is directed toward reducing turbulent flow throughout centrifugal separators.

SUMMARY OF THE INVENTION

A centrifugal separator which incorporates this invention comprises an upper inlet chamber and separation barrel connected thereto. The upper inlet chamber comprises an inlet through which a solids-laden fluid is introduced into the upper inlet chamber. An upper portion of the separation barrel extends into the upper inlet chamber below the inlet, such that the interior wall of the upper inlet chamber and the upper portion of the separation volume define a space, hereinafter referred to as the vestibular chamber. The vestibular chamber is further defined by a horizontally disposed plate which is larger in diameter than the separation barrel, but smaller in diameter than the internal diameter of the upper inlet chamber. The upper portion of the separation barrel comprises a plurality of generally axially-oriented slots, wherein the slots penetrate through the wall of the separation barrel tangentially, so as to generally induce a tangential flow pattern to fluid entering the separation barrel from the vestibular chamber.

The purpose of the horizontally disposed plate is two-fold: 1) to distribute the "splash" effect of the fluid hitting the inside of the upper chamber opposite the inlet as it enters the separator, and 2) to encourage the flow towards the slots to be more uniform. With regards to the splash effect, as incoming fluid to the separator impinges on the back side of the upper chamber and fans out (envision a jet of water from a garden hose hitting the side of a house at an angle), a higher velocity flow near the slots is generated. This higher velocity flow translates through the slots and causes an imbalance, or wobble, of flow all the way down the separation barrel. Having the top plate above the slots forces the splash effect to be better distributed around the upper chamber, alleviating some of the imbalance. Because the fluid now "turns a corner", so to speak, as it flows downwards past the plate into the vestibular chamber, at least a portion of the flow turns towards the slots more or less perpendicularly to the slots. This makes for a more uniform approach of the fluid towards the slots rather than a fluid having a higher velocity spiraling down to the slots from above as would occur otherwise. The net effect is a more even distribution of flow all along the length of the slots.

The fluid entering the separation barrel swirls down the wall of the separation barrel in a helical pattern to a portion of the barrel, usually, but not necessarily, at a lower elevation, where the stream encounters a central structure for reversing the direction of flow of the stream, and inducing rotation in the stream. This structure is referred to herein as the spin structure which induces superior flow characteristics to the spin plate utilized in known centrifugal separators. Below the spin structure there is a collection chamber and there is conduit means between the spin structure and the internal wall through which the solids can pass through to the collection chamber. The spin structure causes the central portion of the whirling stream to reverse its axial direction, and flow upwardly through an outlet barrel centrally aligned within the separation barrel, exiting the separator through outlet port at the top of the separation chamber. This outlet barrel is referred to as the vortex finder.

Decreasing the turbulence in the separation barrel adjacent to the spin structure and also decreasing the intrusion of the vortex into the oncoming solids-laden stream substantially reduces the entrainment of solids in the vortex, and thus increases the efficiency of the separator. The inventor herein has found that there is even greater stabilization of the vortex and reduced tendency for turbulent flow to be induced if the spin structure is formed by the top surface of a truncated cone, where the truncated cone comprises a top surface, a base, and a conical surface extending from the base to the top surface and the truncated cone is disposed above the collection chamber. The collection chamber may also have a larger diameter than the separation barrel.

The above and other features of this invention will be fully understood from the following detailed description and the accompanying drawings.

DETAILED DESCRIPTION OF THE EMBODIMENTS

Description of the Prior Art Separator

Figure 1:
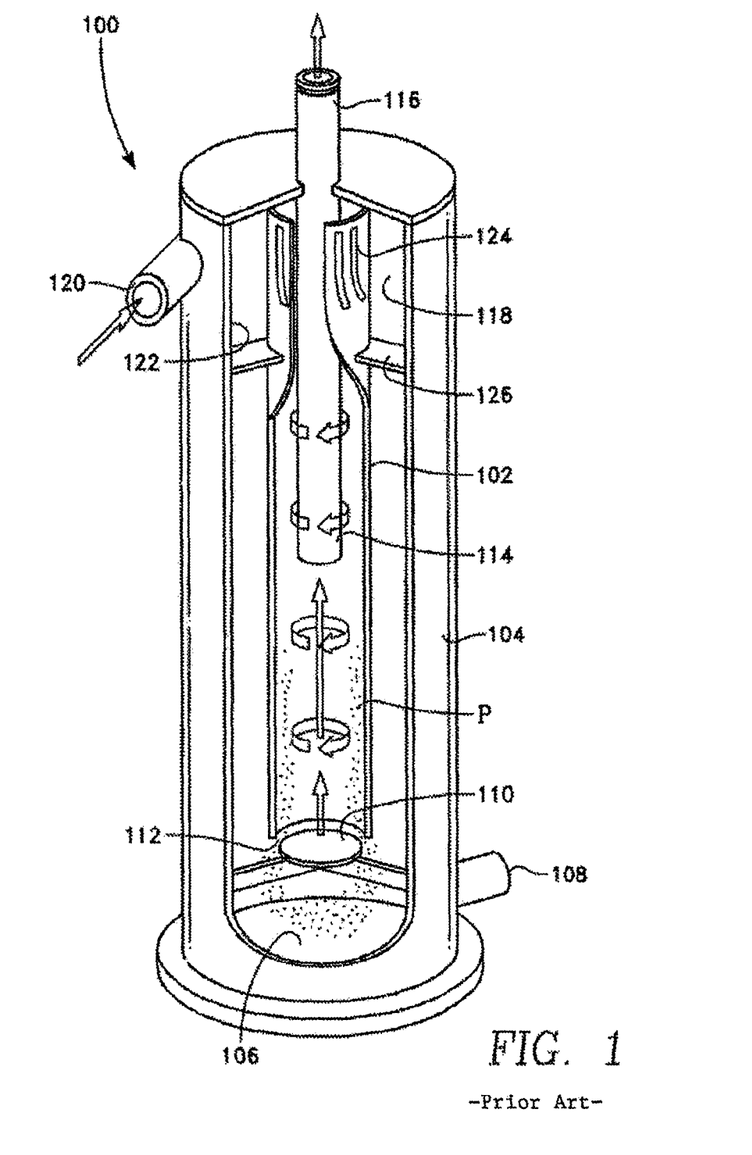
FIG. 1 depicts a known centrifugal separator.

FIG. 1 depicts a known centrifugal separator 100. Its basic functional element is a separation barrel 102 which is contained within an outer housing 104. A collection chamber 106 is placed at the lower end of the outer housing 104 where the collection chamber collects separated solids P, from the downward liquid flow, which is illustrated by the clockwise arrows within the separation barrel. This downward liquid flow may contain a high concentration of entrained solids, which are forced against the interior wall of the separation barrel by centrifugal force. A drain port 108 at the bottom end of the collection chamber 106 enables the solids and some liquids to be drawn from it, either continuously or from time to time. At or near the lower end of the separation barrel 102 there is a spin plate 110 which extends normal to the central axis of the separation barrel. A slot 112 or other conduit means is left between the spin plate 110 and the separation barrel 102 to allow the passage of solids from the separation barrel into the collection chamber 106. An outlet barrel 114 is centrally located within the upper end of the separation barrel 102. The outlet barrel 114 includes an exit tube 116 for exit of treated liquids.

An acceptance chamber 118 is formed by the outer housing 104 around the upper end of the separation barrel 102. The acceptance chamber 118 is annularly-shaped and fits around and in fluid-sealing relationship with the separation barrel 102 and is separated from the lower portion of the outer housing 104 by dividing wall 126. An injector nozzle 120 through the wall of the outer housing 104 is directed tangentially into the acceptance chamber 118. The injector nozzle 120 injects the solid-laden liquid stream under pressure into the acceptance chamber 118. This creates a circular flow between wall 122 of the outer housing 104 and the outside wall of the separation barrel 102. Entrance slots 124 through the wall of the separation barrel 102 pass the stream from the acceptance chamber 118 into the separation barrel.

The separation of solids from liquids is derived from fields of g force. The stream is injected into the separation barrel 102 at a high velocity, and whirls as a swiftly flowing helically moving stream from the upper end to the lower end of the separation barrel. In the separation barrel, the centrifugal forces are much greater than the gravitational force, and particles P are forced outwardly by centrifugal action.

The smaller the diameter of the separation barrel 102, the greater the centrifugal force becomes for the same linear speed along the inner surface of the barrel. At or near a lower end of the separation barrel 102, the spin plate 110 induces a spiral motion to the stream, thus creating a vortex. The liquid of the vortex flows away from the spin plate upward towards the outlet barrel 114, as depicted by the upwardly pointing arrows in FIG. 1. The outlet barrel 114 is also referred to as the vortex finder. In a properly operating separator, the liquid stream flowing out through exit tube 116 is substantially free of solids.

Description of the Invention

Figure 2:
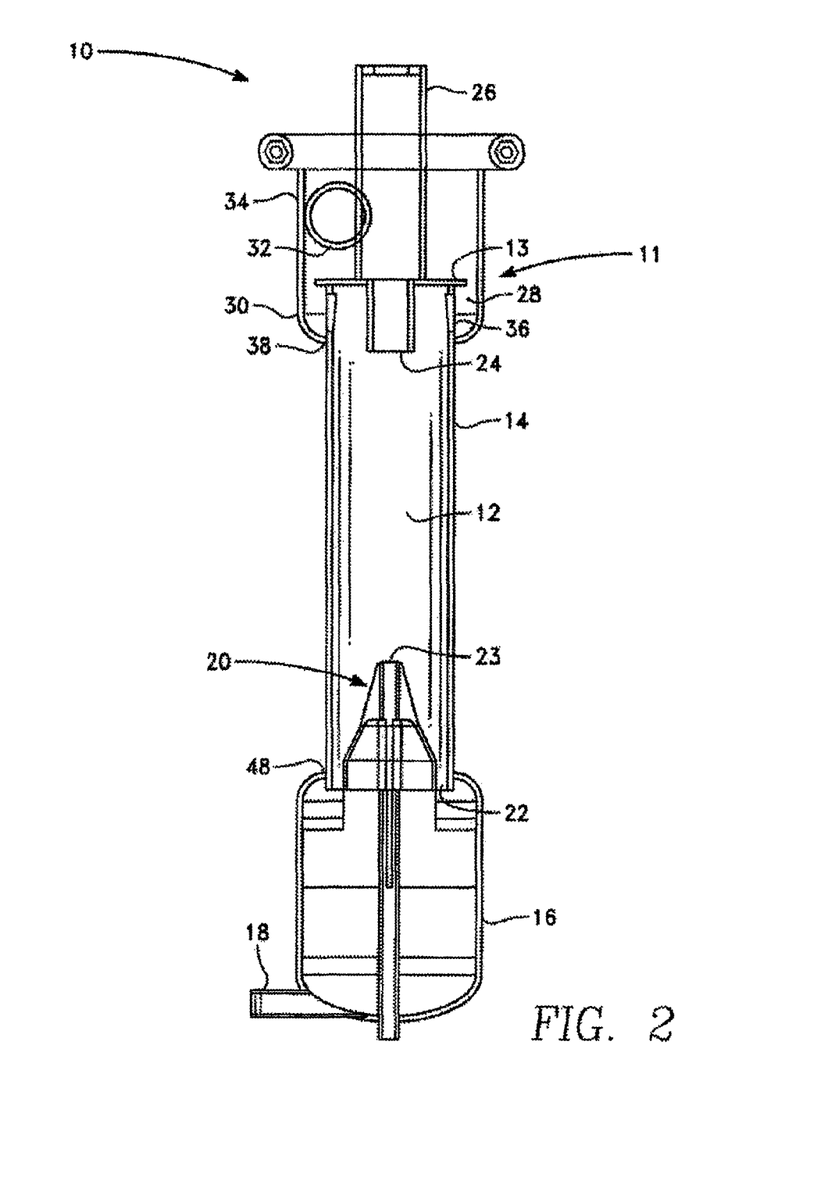
FIG. 2 shows a side view of an embodiment of the disclosed centrifugal separator.
Figure 3:
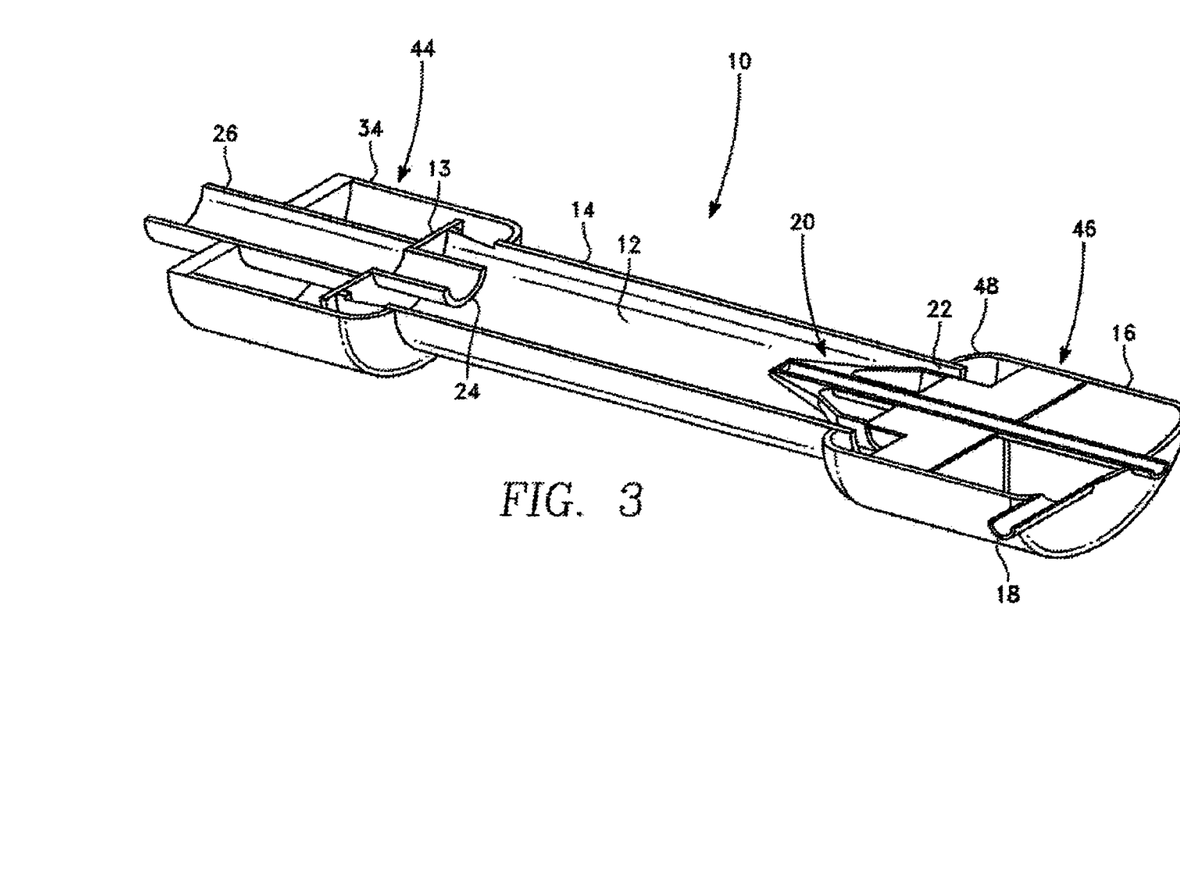
FIG. 3 shows a sectional perspective view of an embodiment of the disclosed centrifugal separator.

FIGS. 2-3 generally depict a centrifugal separator 10 comprising the present invention. As shown in FIGS. 2-3, the improved separator comprises an upper inlet chamber 11 and an interconnected separation barrel 12 which is contained within an outer housing 14. A collection chamber 16 is located at the lower end of the separator. It may be seen by comparing FIGS. 1 and 2 that embodiments of the present invention may form the separation barrel 12 immediately within the outer housing 14, without the need of the intermediate wall structure utilized by the separator in FIG. 1. Collection chamber 16 collects separated solids from the downward liquid flow. A drain port 18 at the bottom end of the collection chamber 16 enables the solids and some liquids to be drawn from it, either continuously or from time to time.

At or near the lower end of the separation barrel 12 there is a spin structure 20 which generally extends normal to the central axis of the separation barrel. Spin structure 20 preferably comprises a truncated conical configuration such as that depicted in the figures. In this embodiment, spin structure 20 comprises a truncated cone 21 having a top 23 and a base 25. The truncated cone 21 comprises an exterior conical surface 27 which extends axially from the base 25 to the flat top surface 23. Spin structure 20 may comprise a lower section 29 and an upper section 31. In this embodiment, lower section 29 comprises a first base 25 (the same base as before). Lower section 29 further comprises a top 33. A first axially-extending conical surface 35 extends from the first base 25 to the first top 33. Similarly, the upper section 31 comprises a second base which is defined by first top 33, because the top of the lower section 29 is also the base of the upper section. The top of the upper section is defined by the top 23 of the spin structure. A second axially-extending conical surface 37 extends from the second base 33 to the top 23.

An annular opening 22, or other conduit means is left between the spin structure 20 and the inside wall of the outer housing 14, which allows the passage of solids from the separation barrel 12 into the collection chamber 16. An outlet barrel 24 or vortex finder is centrally located within the upper end of the separation barrel 12. The vortex finder 24 includes an exit tube 26 for exit of treated liquid. It has been found that the length of the outlet barrel impacts performance of the separator. Embodiments of the present invention may utilize vortex finders 24 in which the distance from the bottom end of the vortex finder to the entrance slots 38 is approximately 0.125× the inside diameter of the separation barrel 12. Shortening the vortex finder had a dramatic effect on performance compared to previous longer vortex finders.

Figures 4, 5:
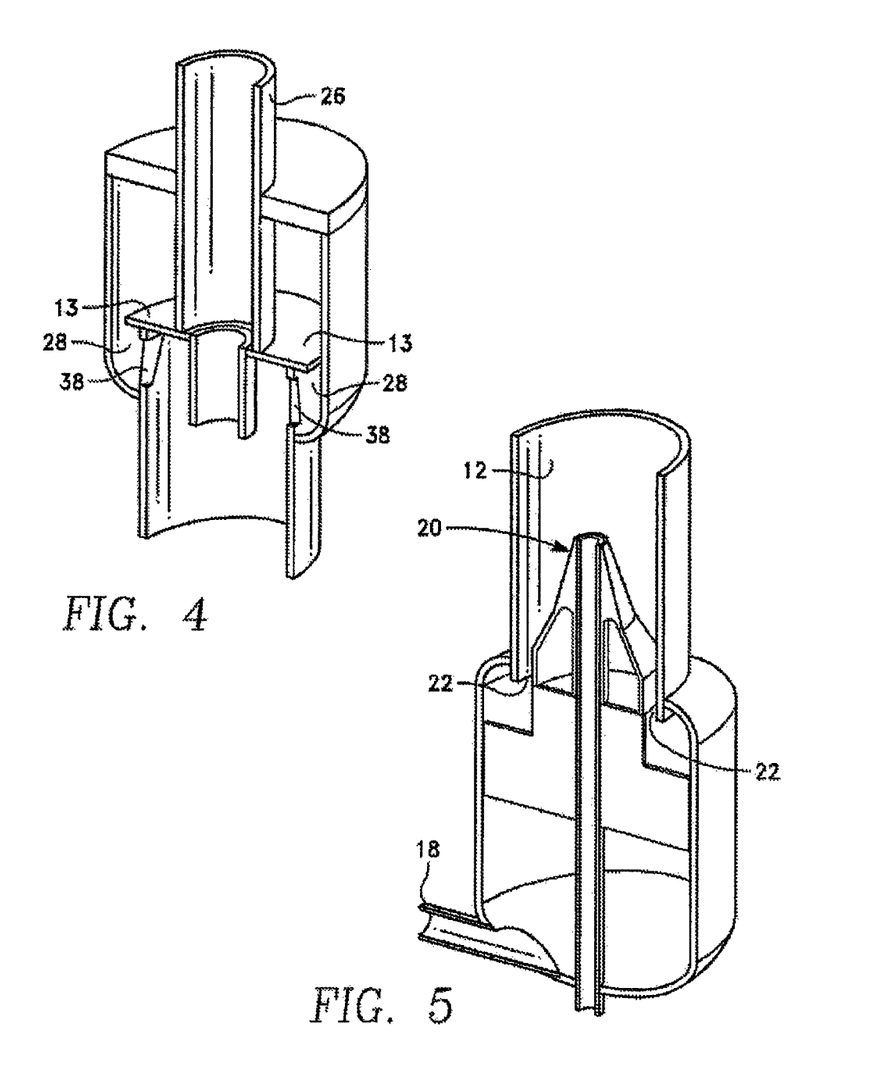
FIG. 4 shows a sectional perspective view of the upper inlet chamber and upper portion of the separation barrel.
FIG. 5 shows a sectional perspective view of an embodiment of a spin structure utilized in the present invention.
Figures 6, 7:
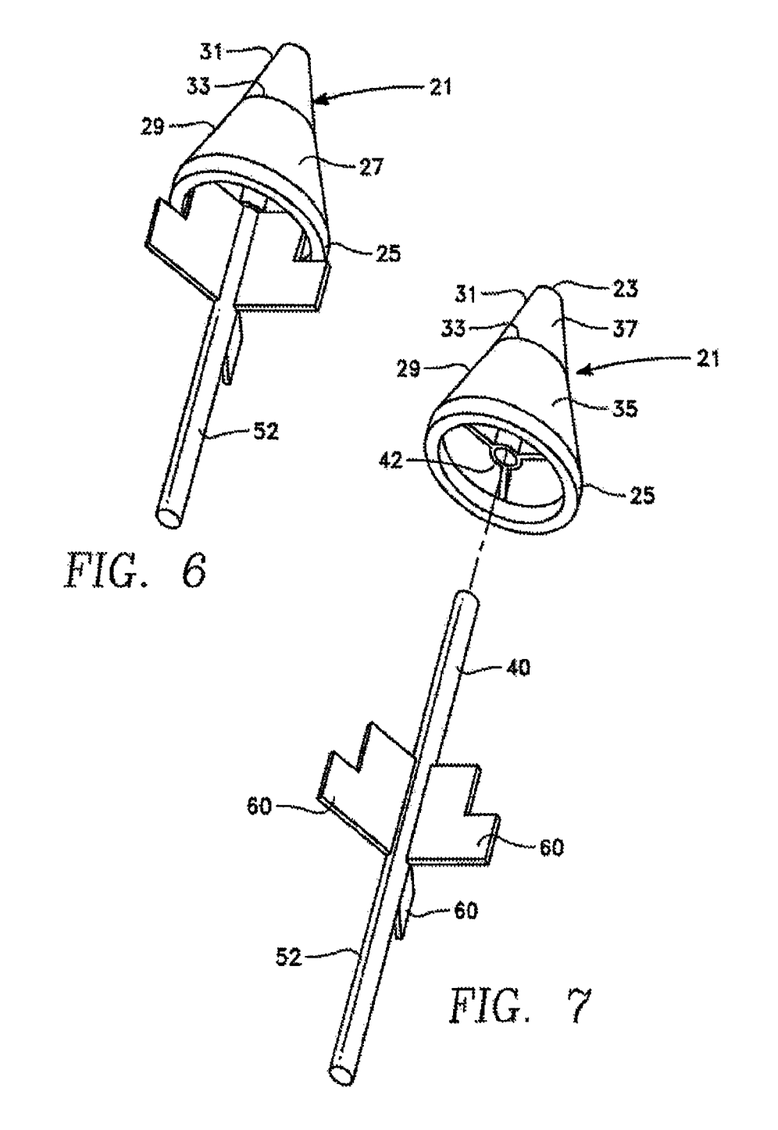
FIG. 6 shows an embodiment of a conical spin structure of the present invention.
FIG. 7 shows an exploded view of the conical spin structure depicted in FIG. 6.
Figure 8:
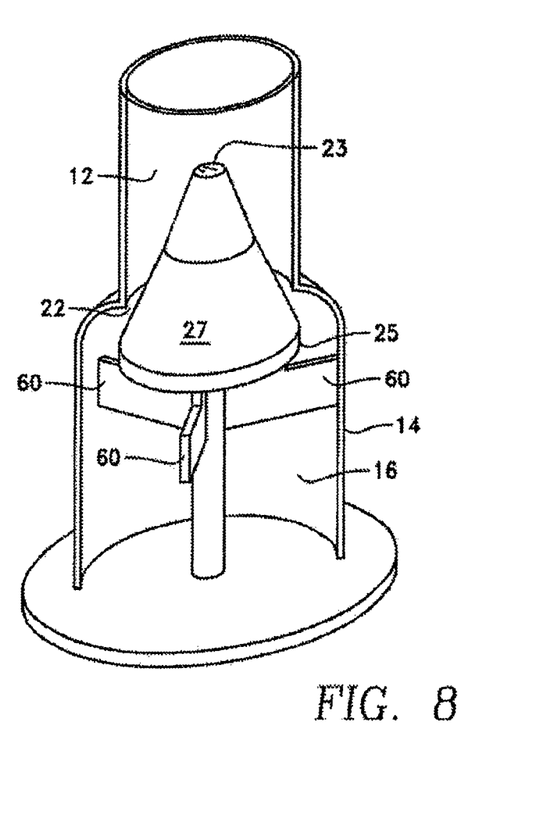
FIG. 8 depicts the positioning of the rod and conical spin structure depicted in FIG. 6 within the separator.

A vestibular chamber 28 is formed between an upper portion 36 of the separation barrel 12 and the inside wall 30 of the upper inlet chamber 11. The vestibular chamber 28 is annularly-shaped and fits around and in fluid-sealing relationship with upper end 36 of the separation barrel 12. An injector nozzle 32 through the wall of the outer housing 14 is directed tangentially into the top end of the upper inlet chamber 11, above the upper portion 36 of the separation barrel 12. A top plate 13 separates the vestibular chamber 28 from the top end of the upper inlet chamber. The injector nozzle 32 injects the solid-laden liquid stream under pressure into the top end of the upper inlet chamber 11. This creates a circular flow above top plate 13. In order to flow into the vestibular chamber 28, the fluid must "turn a corner" by flowing downwards past the top plate 13 into the vestibular chamber. The upper portion 36 of the separation barrel 12 comprises a plurality of entrance slots 38 through the wall to allow flow of the solid laden fluid from the vestibular chamber 28 into the separation chamber. The slots may be generally axially-oriented, with the slots penetrating through the wall of the separation barrel tangentially, so as to generally induce a tangential flow pattern to fluid entering the separation barrel 12 from the vestibular chamber 28. The widths of slots 38 may be designed to be no than the wall thickness of separation barrel 12. For example, if the wall thickness of separation barrel 12 is ¼", the slots may be designed to be ¼" inch wide. It has been found that maintaining this relationship provides improved performance. Increasing the slot width allows the passing of larger particles than previously allowed.

As with the separator depicted in FIG. 1, the separation of solids from liquids is derived from fields of g force. The stream is injected into the separation barrel 12 at a high velocity, and whirls as a swiftly flowing helically moving stream from the upper end to the lower end of the separation barrel 12. In the separation barrel, the centrifugal forces are much greater than the gravitational force, and particles are forced outwardly by centrifugal action.

The smaller the diameter of the separation barrel 12, the greater the centrifugal force becomes for the same linear speed along the inner surface of the barrel. At or near a lower end of the separation barrel 12, the spin structure 20 induces a spiral motion to the stream, thus creating a vortex. The liquid comprising the vortex flows away from the spin structure 20 upward towards the outlet barrel 24 (or vortex finder) and out through the exit tube 26.

As shown in FIG. 3, outer housing 14 may comprise a top 44 and a bottom 46. In this configuration, the diameter of the separator 10 increases below the flat top surface 23 of the spin structure 20 from a first diameter to a second diameter, where the first diameter comprises the inside diameter of the separation barrel 12 and the second diameter comprises the inside diameter of the collection chamber 16. The increasing diameter of the collection chamber 16 defines a shoulder section 48 between the separation barrel 12 and the collection chamber 16, where the shoulder section extends from the bottom of the separation barrel to the top of the collection chamber. In this configuration, an opening 22 is defined between the shoulder section 48 and the spin structure 20. This opening provides a conduit means between the spin plate and the sump region for passage of liquid and solids into the collection chamber 16.

Figure 9:
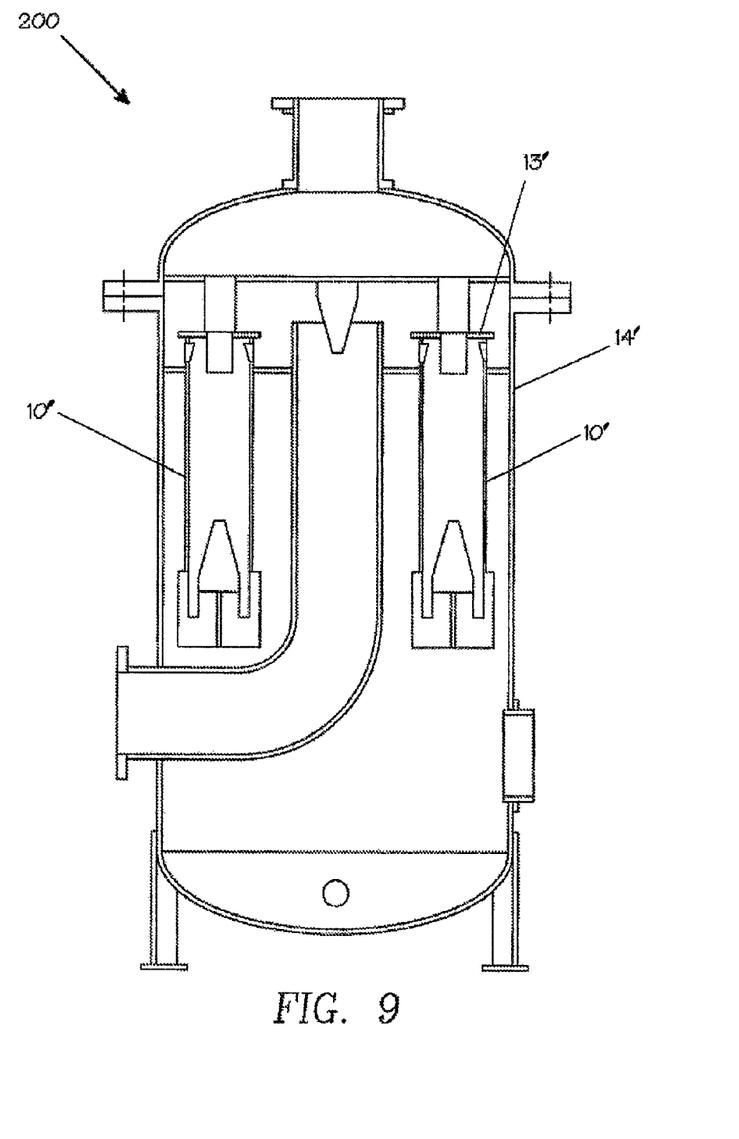
FIG. 9 shows how multiple separators of the present design may be contained within a single housing for staged separation.

As depicted in FIG. 9, a separating apparatus 200 may comprise multiple separators 10' of the present design may be contained within a single housing 14' for staged separation. By using the top plate 13' and thicker walled separation barrels 12' to improve the flow entering the separation barrel, we no longer require an upper chamber around each individual separation barrel. Using a series of smaller identical separators allows the attaining of higher efficiencies at higher flows than can be attained by using a single larger separator.

While the above is a description of various embodiments of the present invention, further modifications may be employed without departing from the spirit and scope of the present invention. Thus the scope of the invention should not be limited by the specific structures disclosed. Instead the true scope of the invention should be determined by the following appended claims.

What is claimed is:

1. A separator for separating solids from liquid in a liquid/solid mixture, said separator comprising:
    an upper inlet chamber comprises an inlet through which a solids-laden fluid is introduced into the upper inlet chamber, the upper inlet chamber having an inside wall defining an inside diameter;
    a separation barrel attached to the upper inlet chamber, the separation barrel having an outside wall defining an outside diameter, a central axis, an upper end, a lower end, a bottom, an interior wall which is an axially-extending cylindrical surface of rotation, a portion of the upper end extending into the upper inlet chamber, said portion comprising a plurality of generally axially-oriented slots extending through said interior wall of the separation barrel to inject the mixture into said upper end of the separation barrel in a spinning motion to separate solids from the liquid by centrifugal force; and
    a vestibular chamber disposed adjacent to the plurality of generally axially-oriented slots, the vestibular chamber defined by the inside wall of the upper inlet chamber and by the outside wall of the portion of the separation barrel extending into the upper inlet chamber, said vestibular chamber further defined at an upper end by a horizontally disposed top plate, the top plate having a diameter larger than the outside diameter of the separation barrel, but smaller in diameter than the inside diameter of the upper inlet chamber.

2. The separator of claim 1 further comprising a spin structure in axial adjacency to said lower end of said separation barrel.

3. The separator of claim 2 further comprising a collection chamber having a top and a sump region below said spin structure for receiving solids.

4. The separator of claim 3 further comprising at least one opening between the spin structure and the sump region through which the solids containing material may pass.

5. The separator of claim 2 wherein the spin structure comprises a truncated cone, the truncated cone comprising a top, a base, and an axially-extending conical surface extending from the base to the top.

6. The separator of claim 5 wherein the truncated cone comprises a lower section and an upper section, wherein the lower section comprises a first base and a first top, and a first axially-extending conical surface extends from the first base to the first top and the upper section comprises a second base, defined by the first top, and a second top.

7. The separator of claim 6 wherein the first axially-extending conical surface comprises a first locus of points, the first locus of points defining a first line between the first base and the first top, the first line having a first slope and the second axially-extending conical surface comprises a second locus of points, the second locus of points defining a second line between the second base and the second top, the second line having a second slope, wherein the first slope is less than the second slope.

8. The separator of claim 5 wherein the truncated cone is supported by a plurality of radial supports attached to the inside of the collection chamber.

9. The separator of claim 2 further comprising a first diameter defined by the inside diameter of the separation barrel and a second diameter defined by the inside diameter of the collection chamber, wherein the inside diameter of the separator increases below the top of the spin structure from the first diameter to the second diameter.

10. The separator of claim 9 having an internal diameter which incrementally increases from the first diameter to the second diameter, the increasing internal diameter defining a shoulder section between the separation barrel and the collection chamber, the shoulder section extending from the bottom of the separation barrel to the top of the collection chamber.

11. The separator of claim 10 wherein at least one opening is defined between the shoulder section and the truncated cone, the at least one opening comprising a conduit means between the spin structure and the sump region.

12. A separator for separating solids from liquid in a liquid/solid mixture, said separator comprising:
   an upper inlet chamber comprising an inlet through which a solids-laden fluid is introduced into the upper inlet chamber, the upper inlet chamber having an inside wall defining an inside diameter;
   a separation barrel attached to the upper inlet chamber, the separation barrel having an outside wall defining an outside diameter, a central axis, an upper end, a lower end, a bottom, an interior wall which is an axially-extending cylindrical surface of rotation, a portion of the upper end extending into the upper inlet chamber, said portion comprising a plurality of generally axially-oriented slots extending through said interior wall of the separation barrel to inject the mixture into said upper end of the separation barrel in a spinning motion to separate solids from the liquid by centrifugal force; and
   a vestibular chamber disposed adjacent to the plurality of generally axially-oriented slots, the vestibular chamber defined by the inside wall of the upper inlet chamber and by the outside wall of the portion of the separation barrel extending into the upper inlet chamber, said vestibular chamber further defined at an upper end by a horizontally disposed top plate;
   an exit tube disposed above the horizontally disposed top plate, the exit tube providing a conduit for flow of filtered fluid from the separation barrel the exit tube having an exit tube diameter; and
   a vortex finder depending from the horizontally disposed top plate, the vortex finder having a vortex finder diameter, wherein the exit tube diameter is larger than the vortex finder diameter.

13. The separator of claim 12 further comprising a spin structure in axial adjacency to said lower end of said separation barrel.

14. The separator of claim 13 further comprising a collection chamber having a top and sump region below said spin structure for receiving solids.

15. The separator of claim 14 further comprising at least one opening between the spin structure and the sump region through which the solids may pass.

16. The separator of claim 13 wherein the spin structure comprises a truncated cone, the truncated cone comprising a top, a base, and an axially-extending conical surface extending from the base to the top.

17. The separator of claim 16 wherein the truncated cone comprises a lower section and an upper section, wherein the lower section comprises a first base and a first top, and a first axially-extending conical surface extends from the first base to the first top and the upper section comprises a second base, defined by the first top, and a second top.

18. The separator of claim 17 wherein the first axially-extending conical surface comprises a first locus of points, the first locus of points defining a first line between the first base and the first top, the first line having a first slope and the second axially-extending conical surface comprises a second locus of points, the second locus of points defining a second line between the second base and the second top, the second line having a second slope, wherein the first slope is less than the second slope.

19. The separator of claim 16 wherein the truncated cone is supported by a plurality of radial supports attached to the inside of the collection chamber.

20. The separator of claim 13 further comprising a first diameter defined by the inside diameter of the separation barrel and a second diameter defined by the inside diameter of the collection chamber, wherein an inside diameter of the separator increases below the top of the spin structure from the first diameter to the second diameter.

21. The separator of claim 20 wherein as the diameter of the separator incrementally increases from the first diameter to the second diameter, the increasing diameter defines a shoulder section between the separation barrel and the collection chamber, the shoulder section extending from the bottom of the separation barrel to the top of the collection chamber.

22. The separator of claim 21 wherein at least one opening is defined between the shoulder section and the truncated cone, the at least one opening comprising a conduit means between the spin structure and the sump region.

* * * * *